US007941311B2

(12) United States Patent
Kaplan et al.

(10) Patent No.: US 7,941,311 B2
(45) Date of Patent: May 10, 2011

(54) SYSTEM AND METHOD FOR LINGUISTIC COLLATION

(75) Inventors: Michael S. Kaplan, Redmond, WA (US); Catherine Ann Wissink, Medina, WA (US); Julie D. Bennett, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 10/691,424

(22) Filed: Oct. 22, 2003

(65) Prior Publication Data
US 2005/0091035 A1    Apr. 28, 2005

(51) Int. Cl.
*G06F 17/20* (2006.01)
(52) U.S. Cl. ....... 704/8; 704/9; 704/10; 704/4; 704/500; 341/106; 341/107; 341/63; 341/51; 709/247; 382/229; 382/239; 700/83; 524/494; 715/201
(58) Field of Classification Search .................. 715/533, 715/536, 201; 341/106, 107, 63, 51; 704/4, 704/9, 10, 201, 8, 500; 707/1, 2, 7, 205; 382/229, 239; 709/247; 700/83; 524/494
See application file for complete search history.

(56) References Cited

U.S. PATENT DOCUMENTS

| 4,771,401 | A | * | 9/1988 | Kaufman et al. | 715/206 |
|---|---|---|---|---|---|
| 4,843,389 | A | * | 6/1989 | Lisle et al. | 341/106 |
| 4,862,167 | A | * | 8/1989 | Copeland, III | 341/107 |
| 5,029,084 | A | * | 7/1991 | Morohasi et al. | 704/9 |
| 5,148,541 | A | * | 9/1992 | Lee et al. | 1/1 |
| 5,276,616 | A | * | 1/1994 | Kuga et al. | 704/10 |
| 5,537,551 | A | * | 7/1996 | Denenberg et al. | 709/247 |
| 5,640,575 | A | * | 6/1997 | Maruyama et al. | 704/4 |
| 5,778,380 | A | * | 7/1998 | Siefert | 1/1 |
| 5,873,111 | A | * | 2/1999 | Edberg | 715/202 |
| 5,889,481 | A | * | 3/1999 | Okada | 341/51 |
| 6,075,470 | A | * | 6/2000 | Little et al. | 341/107 |
| 6,121,903 | A | * | 9/2000 | Kalkstein | 341/63 |
| 6,260,051 | B1 | * | 7/2001 | Katayama et al. | 715/201 |
| 6,404,931 | B1 | * | 6/2002 | Chen et al. | 382/239 |
| 6,640,145 | B2 | * | 10/2003 | Hoffberg et al. | 700/83 |
| 6,748,363 | B1 | * | 6/2004 | Lueck et al. | 704/500 |

(Continued)

OTHER PUBLICATIONS

Davis et al.: "Unicode Technical Standard #10," *Unicode Technical Reports*, pp. 1-38; retrieved from file://C:DOCUME~kchang\LOCALS~1\Temp\BDLYVZVN.htm Sep. 29, 2003.

(Continued)

*Primary Examiner* — Richemond Dorvil
*Assistant Examiner* — Michael C Colucci
(74) *Attorney, Agent, or Firm* — Christopher J. Volkmann; Westman, Champlin & Kelly, P.A.

(57) ABSTRACT

A system and method is provided for handling the collation of linguistic symbols of different languages that may have various types of compressions (e.g., from 2-to-1 to 8-to-1). A symbol table of the symbols identified as Unicode code points is generated, with each symbol tagged with a highest compression type of that symbol by sorting the compression tables of the various languages. During a sorting operation with respect to a given string, the tag of a symbol in the string is checked to identify the highest compression type of compressions beginning with that symbol, and the compression tables for the language with compression types equal or lower than the highest compression type of the symbol are searched using a binary search method to find a matching compression for the symbols in the string. A common search module is used to perform binary searches through compression tables of different compression types.

18 Claims, 6 Drawing Sheets

U.S. PATENT DOCUMENTS

| | | | |
|---|---|---|---|
| 6,877,003 B2 * | 4/2005 | Ho et al. | 707/7 |
| 6,928,438 B2 * | 8/2005 | Daray et al. | 1/1 |
| 7,130,470 B1 * | 10/2006 | Ho | 382/229 |
| 2001/0036992 A1 * | 11/2001 | Furuya et al. | 524/494 |
| 2002/0174100 A1 * | 11/2002 | Daray et al. | 707/1 |
| 2002/0184251 A1 * | 12/2002 | Ho et al. | 707/205 |
| 2005/0091035 A1 * | 4/2005 | Kaplan et al. | 704/8 |

OTHER PUBLICATIONS

Wissink et al.: "Sorting it all out: An introduction to collation," *21st International Unicode Conference*, Dublin, Ireland, May 2002, pp. 1-18.

Wissink, et al.: "Issues in Indic Language Collation," *19th International Unicode Conference*, San Jose, California, Sep. 2001, pp. 1-9.

* cited by examiner

Default Table (excerpt)

| Code Point | SM | AW | DW | CW | Comments |
|---|---|---|---|---|---|
| 0x0308 | 1 | 0 | 17 | 0 | ;Non-Spacing Diaeresis |
| 0x0300 | 1 | 0 | 13 | 0 | ;Non-Spacing Grave Accent |
| 0x0061 | 14 | 2 | 2 | 2 | ;Latin Small Letter A |
| 0x00e4 | 14 | 2 | 19 | 2 | ;Latin Small Letter A Diaeresis |
| 0x0041 | 14 | 2 | 2 | 18 | ;Latin Capital Letter A |
| 0x00c4 | 14 | 2 | 19 | 18 | ;Latin Capital Letter A Diaeresis |
| 0x0042 | 14 | 9 | 2 | 18 | ;Latin Capital Letter B |
| 0x00f6 | 14 | 124 | 19 | 2 | ;Latin Small Letter O Diaeresis |
| 0x00d6 | 14 | 124 | 19 | 18 | ;Latin Capital Letter O Diaeresis |
| 0x005a | 14 | 169 | 2 | 18 | ;Latin Capital Letter Z |
| 0x03b4 | 15 | 5 | 2 | 2 | ;Greek Small Delta |
| 0x03b5 | 15 | 6 | 2 | 2 | ;Greek Small Epsilon |
| 0x03ad | 15 | 6 | 5 | 2 | ;Greek Small Epsilon Tonos |
| 0x0395 | 15 | 6 | 2 | 18 | ;Greek Capital Epsilon |
| 0x0388 | 15 | 6 | 5 | 18 | ;Greek Capital Epsilon Tonos |

Exception Table (Danish)

```
LCID  0x00000406    20            ;Danish
LCID  0x00000414                  ;Norwegian(Bokmal)
LCID  0x00000814                  ;Norwegian(Nynorsk)

0x00e4      14    172    19    2       ;Latin Small Letter A Diaeresis
0x00c4      14    172    19    18      ;Latin Capital Letter A Diaeresis
0x00f6      14    174    19    2       ;Latin Small Letter O Diaeresis
0x00d6      14    174    19    18      ;Latin Capital Letter O Diaeresis
```

FIG. 4

SYSTEM AND METHOD FOR LINGUISTIC COLLATION

TECHNICAL FIELD

This invention relates generally to the handling of different written languages in the context of computer data processing, and more particularly to the operation of linguistically collating linguistic elements used in various languages.

BACKGROUND OF THE INVENTION

One of the greatest challenges in the globalization of computer technologies is to properly handle the numerous written languages used in different parts of the world. The languages may differ greatly in the linguistic symbols they use and in their grammatical structures, and to support most, if not all, languages in various forms of computer data processing can be a daunting task. One critical step taken to facilitate the support of the different languages by computers is to provide a standardized coding system to uniquely identify every symbol in all the languages with a unique number. This coding system, called the Unicode, has been widely adopted by leaders of the computer industry, and is supported in many operating systems, modern browsers, and many other products.

A fundamental operation on textual strings consisting of symbols of a given language is collation, which may be defined as sorting the strings according to an ordering of the symbols that is culturally correct to users of that particular language. Anytime a user orders linguistic data or searches for linguistic data in a logical fashion within the structure of the given language, collation is used. Collation is a rather complex matter and requires an in-depth understanding of the language. For example, in English, a speaker expects a word starting with the letter "Q" to sort after all words beginning with the letter "P" and before all words starting with the letter "R". As another example, in the Chinese language used in Taiwan, the Chinese block characters are often sorted according to their pronunciations based on the "bopomofo" phonetic system as well as the numbers of strokes in the characters. The proper sorting of the symbols also has to take into account variations on the symbols. Common examples of such variations include the casing (upper or lower) of the symbols and modifiers (diacritics, Indic matras, vowel marks) applied to the symbols.

The operation of collation is further complicated by the existence in many languages of special groupings of linguistic symbols that have to be treated as "sort elements" for purpose of linguistically correct sorting. For instance, in Hungarian, "DZS" is a unique combination that is sorted before "E" and after "DZ." Such a special grouping of symbols as a sorting element is conventionally referred to as "compressions" (not to be confused with the usage of "compression" in the context of data size reduction). They are also sometimes referred to as linguistic "characters." Within a given language, there may be several types of compressions (i.e., different numbers of symbols in the compressions). The highest type of compressions varies from language to language, and compressions as high as 8-to-1 are used in Bengali and Tibetan. The existence of compressions makes linguistic sorting more complicated, because for a given input string the sorting program has to determine whether some of the symbols in the string form a compression in order to properly sort the string. In other words, the sorting program has to recognize the language-dependent sort elements in the string. To further complicate the matter, some languages have large numbers of compressions. For instance, Tibetan and Chinese have about 10,000 and 30,000 compressions, respectively, that represent supplemental characters. Since the compressions have to be checked in a sorting operation to identify the sort elements in a textual string, the existence of a large number of compressions can make the sorting operation very time consuming.

The need to properly handle compressions becomes increasingly important as developers of computer software programs try to add support for many new languages that are more complex than those languages already supported. One significant difficulty encountered by the developers is that the existing framework for collation is unable to accommodate the much more complex compressions or the large numbers of compressions used in the new languages. For instance, operating systems traditionally support languages with compression levels no greater than 3-to-1, and the number of compressions in a give language is typically quite small, at most a few tens. The new languages to be supported, however, use compressions with higher compression levels up to 8-to-1, and some of them have tens of thousands of compressions. The existing framework for providing the collation functionality, being developed to handle much lower levels of compressions and much smaller number of compressions, cannot cope with the new compressions presented by the new languages. Moreover, attempts to extend the existing architecture would likely result in un-maintainable code that is complex and difficult to debug. Accordingly, there is a need for a new architecture for providing collation functionality that can effectively support the new languages.

SUMMARY OF THE INVENTION

In view of the foregoing, the present invention provides a new architecture for handling the collation of linguistic characters for different languages. In accordance with the invention, one or more compression tables, each corresponding to a compression type, is provided for a given language that has compressions as sorting elements. The system includes a symbol table that contains a list of code points for symbols of the supported languages, and has a sort weight for the symbol identified by each of the code point. The compression tables are sorted in the build process to tag each code point in the symbol table to indicate the highest compression type (e.g., 3-to-1) of compressions beginning with the symbol identified by that code point. During a sorting operation with respect to an input string of symbols in a given language, when the sorting program encounters a first symbol in a combination of symbols in the string, it checks the tag of the code point in the symbol table for that symbol to identify the highest compression type for that symbol, and searches through the compression tables for the particular language in descending order of compression types starting at the highest compression type of the symbol as indicated by the tag. Each of the compression table is searched using a binary search method to significantly enhance the speed of the search, and a common macro module is called to perform the binary search through each of the compression tables.

BRIEF DESCRIPTION OF THE DRAWINGS

FIG. 3 is an exemplary excerpt of a default symbol table used in the architecture of FIG. 2;

FIG. 4 is an exemplary exception table used in the architecture of FIG. 2;

DETAILED DESCRIPTION OF THE INVENTION

Figure 1:
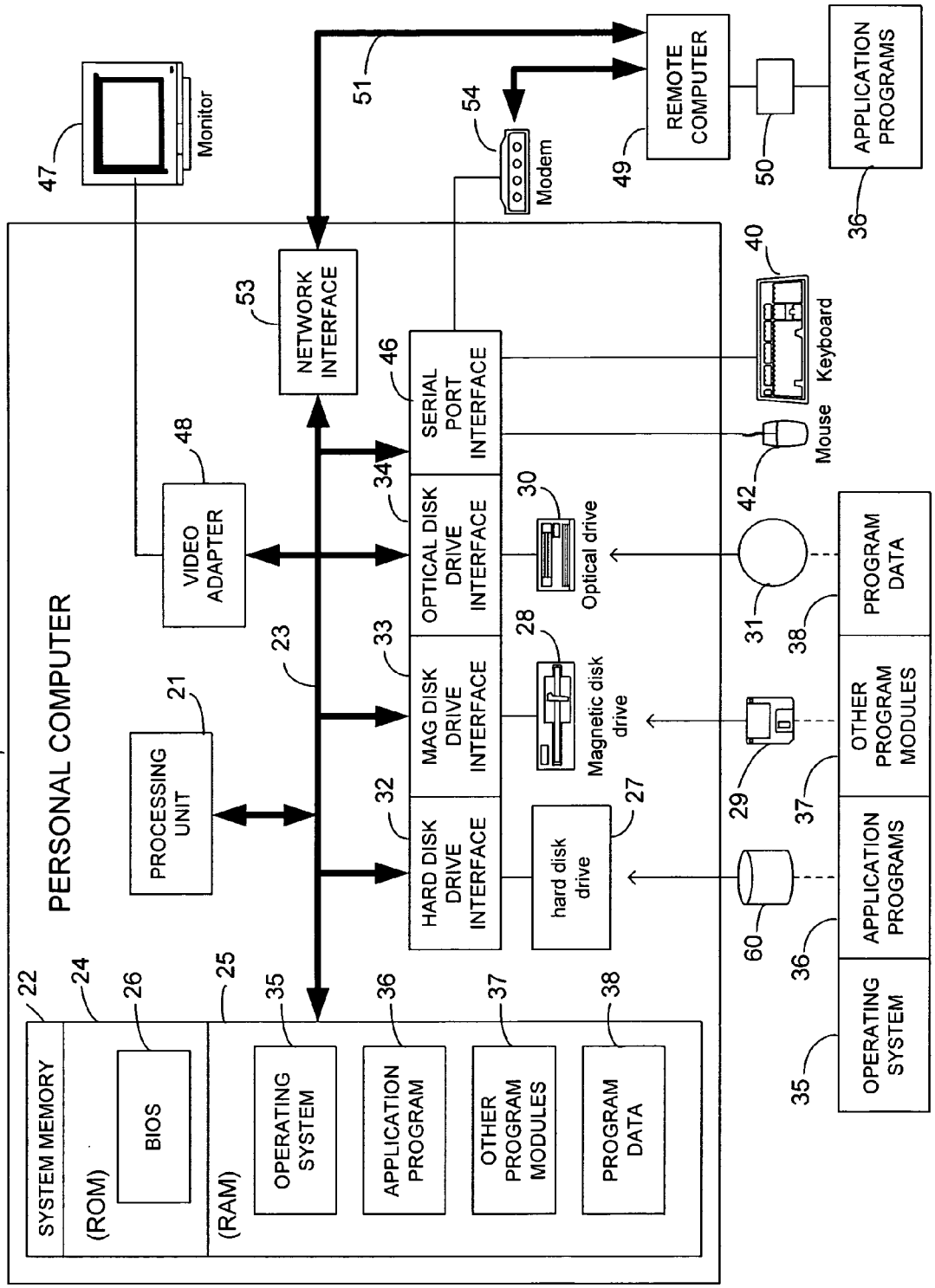
FIG. 1 is a block diagram generally illustrating an exemplary computer system on which an embodiment of an architecture for linguistic collation in accordance with the invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may implement the system and method for collation of linguistic strings in accordance with the invention. The architecture of an embodiment of the invention, including software modules and data structures, for handling compressions (i.e., special grouping of linguistic symbols that form sort elements) in a sorting operation will be described in greater detail with reference to FIGS. 2-6. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, and read only memories may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
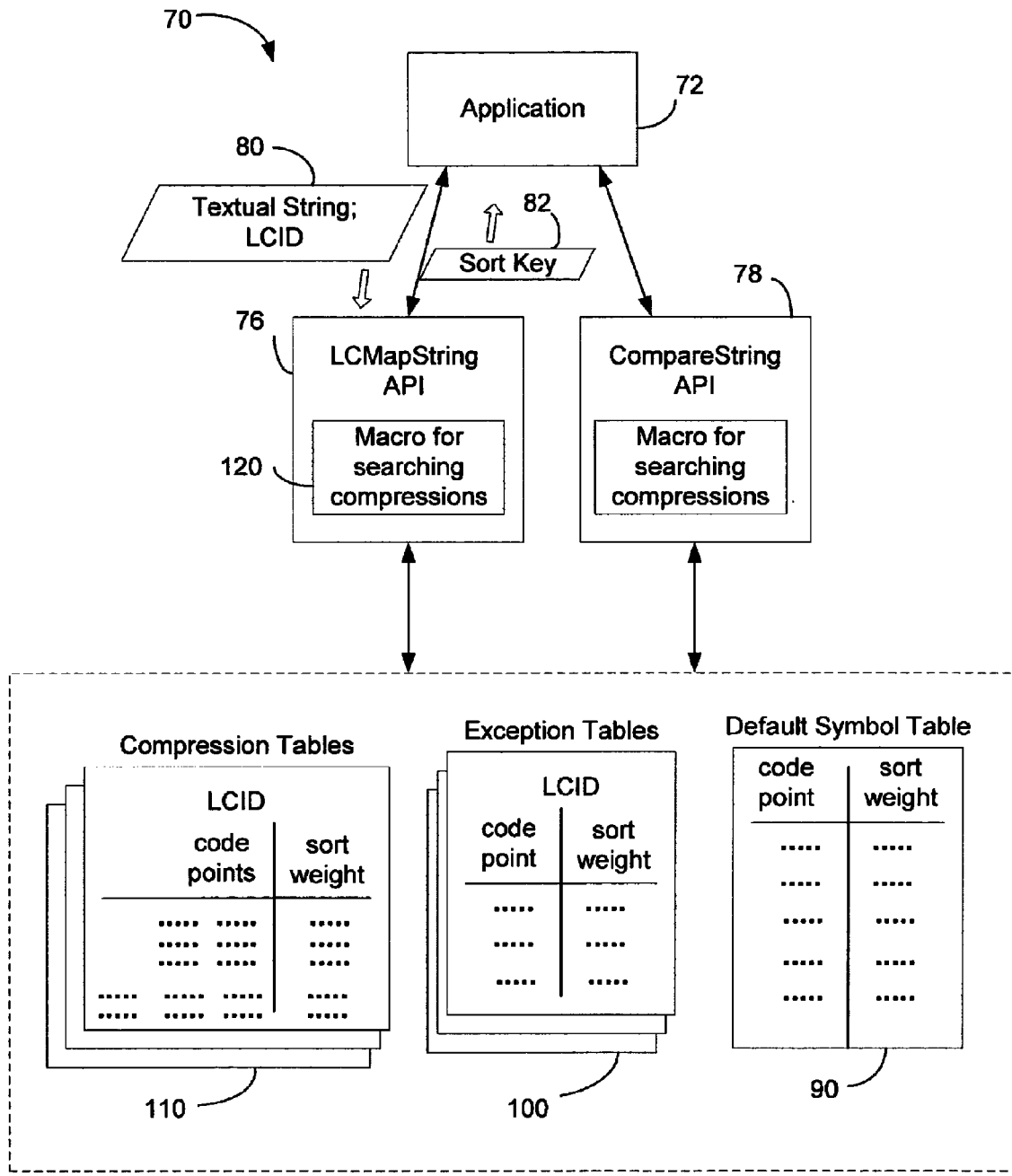
FIG. 2 is a schematic diagram showing the architecture of an embodiment of the invention for providing the functionality of collation of linguistic characters.

Referring now to FIG. 2, the present invention is directed to a new architecture 70 for handling "compressions" that occur in various languages to facilitate collation (i.e., linguistically correct sorting) operations that sort textual strings in a culturally correct manner. In a preferred embodiment, the collation functionality is provided by an operating system of the computer as one of the many functions supported by the operating system. To that end, the operating system provides two application programming interface (API) functions, CompareString and LCMapString, that can be called by user or kernel mode applications 72 to carry out sorting operations. The CompareString API function 76 accepts two character strings as input and compares them to determine which one is sorted before the other, based on the locale information specified as part of the input. The declaration for CompareString is as follows:

```
int CompareString(
    LCID Locale,
    DWORD dwCmpFlags,
    DWORD lpString1,
    DWORD cchCount1,
    DWORD lpString2,
    DWORD cchCount2
);
```

The LCMapString API function 78 with the LCMAP_SORTKEY flag, on the other hand, accepts a single character string 80 as the input and returns a sort key 82 for the input string. The declaration for LCMapString is as follows:

```
int LCMapString(
    LCID Locale,         // locale identifier
    DWORD dwMapFlags,    // mapping transformation type
    LPCTSTR lpSrcStr,    // source string
    int cchSrc,          // number of characters in source string
    LPTSTR lpDestStr,    // destination buffer
    int cchDest          // size of destination buffer
);
```

As mentioned above, the collation architecture of the invention facilitates the handling of compressions used in the various languages to be supported by a computer system. The term "compression" as used herein means a special grouping of linguistic symbols that is to be treated as one unit for linguistic sorting purposes. In other words, a "compression" is a "sort element." As an example, the combination of "dzs" in Hungarian is a compression or sort element that is expected by a Hungarian speaker to be sorted between the letters "d" and "e." A compression may consist of two or more symbols, and the "compression type" (or synonymously "compression level") of a given compression means the number of symbols in a given compression. For instance, the compression type of the compression "dzs" is 3-to-1. The number of compressions and the types of compressions vary greatly from language to language. For example, compressions with compression types as high as 8-to-1 are used in Bengali and Tibetan, while some other languages, such as English, do not have compressions.

In a preferred embodiment, the collation architecture is built upon a coding system according to the Unicode standard. In other words, each individual linguistic symbol is identified by a unique number assigned by the Unicode standard. The coding number assigned to a symbol is often referred to as a "code point." For example, the code point for Latin Small Letter A (i.e., "a") is 0x0041. As described above, a compression is a combination of two or more symbols. Each compression is identified by the code points of the symbols that form the compression. For example, the letter "â" is represented by two code points 0x0041 (Latin Small Letter A) and 0x0302 (Combining Circumflex Accent), and a user would not consider "â" as two letters. Another way to form a compression is to combine stand-alone symbols. For example, "ch" (represented by code points 0x0063 0x0068) in traditional Spanish is treated as a unique sort element to be placed after the letter "h," and the compression "dzs" (represented by code points 0x0064 0x007a 0x0073) in Hungarian is a sort element between "d" and "e."

Since the sorting order of symbols is language dependent, the particular language being considered has to be identified for a sorting operation. In a preferred embodiment, each locale that uses a particular version of language is given a locale identifier (LCID) that uniquely identifies the language of that locale. Examples of LCIDs are 0x00000409 for US-English and 0x0000041e for Thai-Thailand.

For purposes of linguistic sorting operations performed by a computer, a core concept is the creation of sort weights. Each sort element (or "character") in particular language, which may be a symbol or a compression, is given a sort weight. By assigning weights based on the desired ordering of characters, it is possible to easily mask differences (e.g., case or diacritics) that are not important for a particular query, and to quickly do the comparison to identify the order of the characters (e.g., using a database that uses the weights as index values). In one implementation, a sort weight for a symbol or compression is a 32-bit value made up of four 8-bit values. The first 8-bit (or byte) value specifies the "script member" (SM) of the sort element (e.g., Latin, Cyrillic, Gurmukhi, etc.). The second 8-bit value specifies the "alphabetic weight," which is the primary weight used to distinguish one sort element from another (e.g., "A" vs. "B"). The third 8-bit value is the "diacritic weight," which is often used for non-spacing diacritics. This byte is used as a secondary weight difference (e.g., "A" vs. "Ā"), and can be ignored in a sorting operation via a flag to the APIs. The fourth 8-bit value is the "case weight," which is often used for differences in cases. This byte serves as the tertiary weight difference (e.g., "A" vs. "a"), and can be ignored via a flag to the APIs.

As illustrated in FIG. 2, to store the weight information for the various sort elements, multiple tables are used. These data structures are maintained by linguists who work to make sure that the data are linguistically appropriate for all languages supported by the computer software. In the illustrated embodiment, the architecture 70 has a default symbol table 90 for storing the default sort weights for all linguistic symbols included in the Unicode standard (with code points from 0x0000 to 0xFFFF), which each entry representing one single symbol (i.e., not a compression) and containing a 32-bit value that specifies the default sort weights for that symbol. By way of example, an excerpt of data from the default table 90 is shown in FIG. 3. As described above, the sort weight for each symbol in the table is dividing into four 8-bit values (SM, AW, DW, and CW), which are shown in FIG. 3 as separate columns. From this small sample, it can be seen how one could deterministically sort the full list of code points based on their sort weights, and how one could use the code to treat the composite (combined) form of a letter (e.g., A+Diaeresis) with the precomposed form (A Diaresis), as the DW value of the latter is a simple combination of the combined DW values of the former. It is also easy to see how uppercase letters sort after the corresponding lowercase letters, and how different scripts (e.g., Latin vs. Greek) have different SM values.

Returning to FIG. 2, for some locales, the sort weights in the default table for a given symbol may be incorrect. For instance, in Lithuanian, the letter "y" is supposed to be sorted as a unique character after the letter "i", while in English "y" is sorted after "i", and the default sort weights for these two letters reflect the latter sorting order. To keep track of the deviations from the default sorting orders given in the default symbol table, a plurality of exception tables 100 are provided. Each exception table is for a particular language and lists the changes that need to be made to the default table for symbols used in that language. Each entry in the exception table includes the code point for a symbol and its sort weights for that particular language. As an example, FIG. 4 shows a sample excerpt of data in an exception table 102 for Danish. In the table, the LCID of 0x00000406 uniquely identifies the language that requires the exceptions as Danish, and the data columns are in the same format as those in the default table shown in FIG. 3.

Figure 5:
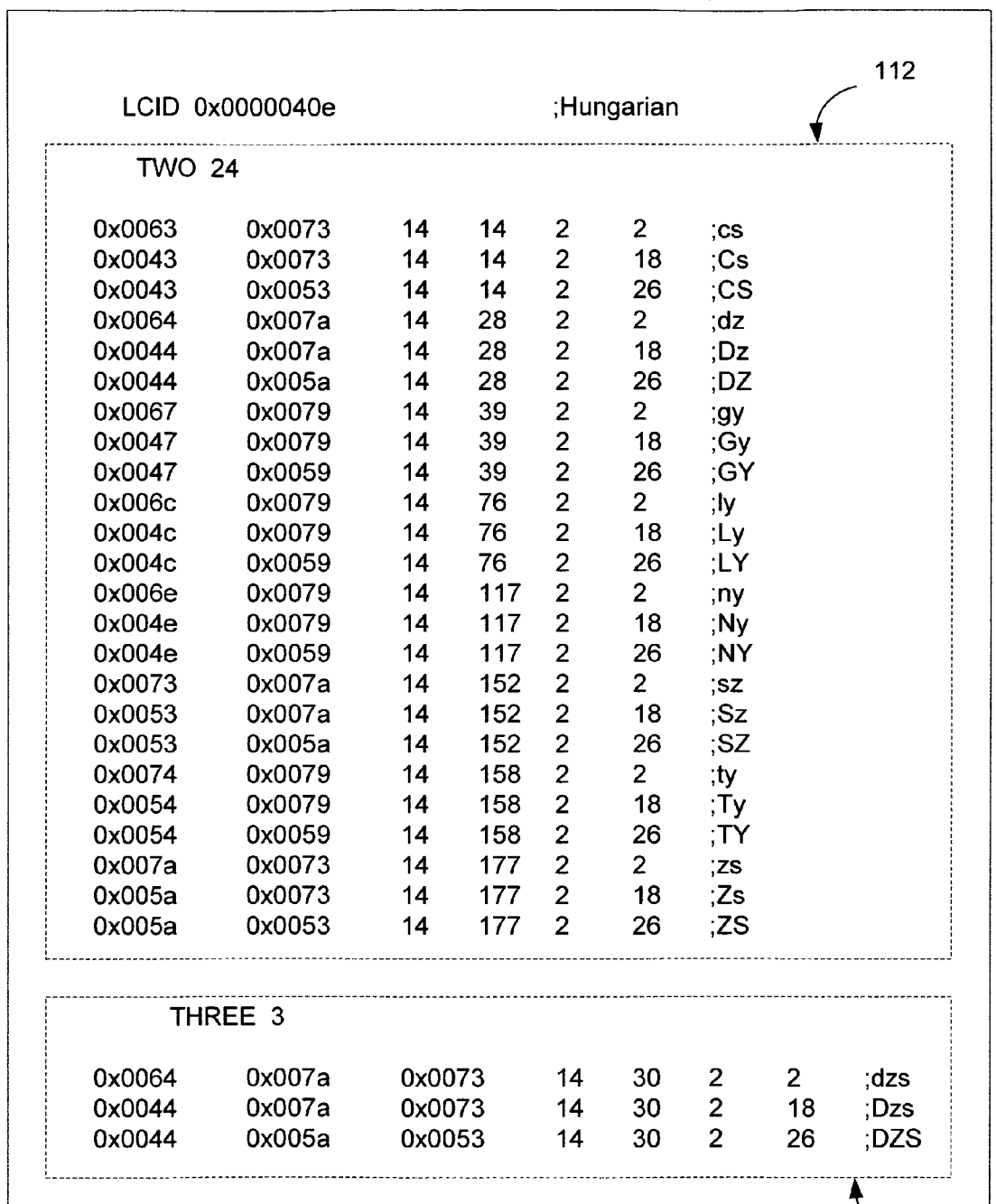
FIG. 5 is an example of compression tables listing compressions used in the Hungarian language.

Again referring to FIG. 2, as described above, many languages use compressions that are to be treated as sort elements. Each compression is formed of multiple symbols, and the "type" of a compression is the number of symbols in that compression. In a preferred embodiment, there is one compression table for each type of compressions used in each language that has compressions. For example, FIG. 5 shows sample compression tables for the Hungarian language. Hungarian uses 2-to-1 and 3-to-1 compressions. Accordingly, there is a 2-to-1 compression table 112 and a 3-to-1 compression table 116. The LCID (0x0000040e) identifies that the compression tables are for the Hungarian language, and there are 24 entries in the 2-to-1 table 112 and 3 entries in the 3-to-1 table 116. As shown in the tables, the Hungarian language includes the compression "dzs" as well as the compression "dz." This example highlights the reason that during a sorting operation the larger compressions have to be checked against the string to be sorted before the smaller ones. For instance, if the string "kodzsy" is to be sorted (either against another string or for producing a sort key), the sort program has to recognize that the "dzs" combination in the string, rather than "dz", is to be treated as a sort element, and this is achieved by searching the 3-to-1 compression table first to finding a match therein. In languages currently supported by a preferred embodiment, compression types up to 8-to-1 are used (e.g., in Bengali and Tibetan). Thus, the compression tables for a language with 8-to-1 compressions may include tables for compression types of 2-to-1, 3-to-1, and so on, all way up to 8-to-1.

As described above, compressions of various types are found in different languages. As the number of new languages supported by computer programs increases, both the compression types and the number of new compressions have increased tremendously, and the existing framework for collation prior to the present invention was not capable of handling those new compressions. For instance, the prior framework dealt with compressions of types only up to 3-to-1. The newly supported languages, however, have compression types as high as 8-to-1, and the prior framework was unable to cope with the increased number of compression types. Specifically, the prior framework used the top three bits in the CW portion of the sort weight of a symbol in the default table as three flags to indicate whether that symbol is not used in any compression or is used in 2-to-1, 3-to-1, or both 2-to-1 and 3-1 compressions. With the new compressions, using such flags to identify whether a symbol is or is not in all the types of compressions up to 8-to-1 would use up too many bits of the CW value. Another problem with the compression tagging mechanism in the prior framework is that the tagging in the default table was done by the linguist by manually setting each of the flag bits for a given symbol, and that process had been a major source of errors in the past.

The present invention provides a new architecture for collation of character strings that effectively addresses the need to handle the much higher compression types and significantly larger numbers of compressions in languages not supported in the prior framework for collation. In accordance with a feature of the invention, a new way of tagging the symbols in the default table is used to support the increased compression types. Instead of attempting to indicate all types of compressions that begin with that symbol, the compression tag indicates only the highest compression type with that symbol. In one implementation, the top three bits of the CW value of the symbol are still used for tagging, but in contrast to the old tagging system, the three bits now form a number instead of three separate flag bits, and the number indicates the highest compression type for the symbol. For example, a tag value of 7 indicates that there is at least one 8-to-1 compression that begins with that symbol, and there may or many not be compressions of a lower type that begin with the symbol.

Moreover, in accordance with the invention, the task of tagging the symbols is performed automatically in the build process. During the build process, the compression tables 110 for all the supported languages are sorted to identify for each symbol the highest type of compressions that begin with that symbol, and the sort weights for the code point in the default table is tagged to indicate that highest type of compression. The compression masks used in one embodiment in this tagging operation are defined as follows:

```
//
// Bit values 5/6/7 of CW displayed on the right
//
//                                      Bit 7 6 5
#define COMPRESS_8_MASK 0xe0 // 1 1 1
#define COMPRESS_7_MASK 0xc0 // 1 1 0
#define COMPRESS_6_MASK 0xa0 // 1 0 1
#define COMPRESS_5_MASK 0x80 // 1 0 0
#define COMPRESS_4_MASK 0x60 // 0 1 1
#define COMPRESS_3_MASK 0x40 // 0 1 0
#define COMPRESS_2_MASK 0x20 // 0 0 1
```

The build process also stores the highest and lowest code points in each of the compression tables 110 to facilitate range checking in a sorting operation, as described below.

As another aspect of the invention, the time spent on searching the compression tables 110 during a sort operation to find a match is significantly reduced by using a binary search method. In the prior collation framework, the search was carried out by sequentially enumerating the entries of the compression table. Such a sequential search is very time-consuming and can be unacceptably slow when there are many compressions in a compression table. For instance, there are about 10,000 and 30,000 supplemental characters in Tibetan and Chinese, respectively, and a sequential enumeration through such large lists of compressions may require tens of thousands of comparisons to find a match, and the large amount time required to go through the compressions would significantly affect the performance of the collation program.

In accordance with the invention, fast searching of a compression table is achieved by employing a binary search algorithm. With the binary search, even a large list can be searched through by doing a small number of comparisons. Taking Chinese as an example, only 15 comparisons (2^15=32,768) have to be carried out to see if a matching compression exists in the about 30,000 supplemental characters, while the conventional collation algorithm would have to enumerate those supplemental characters one by one until a match is found. To facilitate the binary search operation, the entries in each compression table are sorted during the build process according to the combined Unicode values of the compressions, and the binary search method is based on the combined Unicode values. By way of example, in the compression tables for Hungarian as shown in FIG. 5, the compression "ly" is represented by the code point combination of "0x006c 0x0079", while the compression "ny" is represented by the code point combination of "0x006e 0x0079". As a result, "ny" is listed in the 2-to-1 compression table after "cy". During the search operation, when a compression table is to be searched, the highest and lowest code points of the entries in the table are retrieved, and the binary search technique is applied to quickly determine whether a match with a combination of symbols in the input string is found in the compressions in the table.

In accordance with another aspect of the invention, the code of the software program for handling the various compression levels in a sorting operation is significantly simplified by utilizing a sorting module that is called to compare all of the different types of compressions without requiring multiple code paths. In the prior collation framework, a sorting operation involved a complex set of steps to walk through the string to be sorted and detect the compressions in an atomic or discrete manner, and there were thousands of lines in source code for handling the compressions. Such an ad hoc approach to handling different types of compressions is not only prone to errors but also unsuitable for handling the much higher levels of compressions in many newly supported languages. As described in greater detail below, the use of a common sorting module for all the different compression types significantly simplifies the code for collation operations and makes the code easily expandable for handling even higher compression levels.

In one implementation, the sorting module is in the form of a macro module. To illustrate the degree of simplification of the software code achieved, the source code of the macro 120 (FIG. 2) for the LCMapString API is provided below. This macro 120 is called fore each type of compressions. The macro for the CompareString API is similar. As can be seen in the source code, the macro also checks the existence of double compressions.

```
///////////////////////////////////////////////////////////////
// SORTKEY_COMPRESSION_HANDLER
//
// Handles all of the compression types from 8to1 down to 2to1, including
// double compressions. Defined as a macro so that it can be used generically
// with all of the different compression types.
//
// DEFINED AS A MACRO.
///////////////////////////////////////////////////////////////
#define SORTKEY_COMPRESSION_HANDLER(                                                         \
                            Type,            /* Type of compression             */  \
                            pComp,           /* ptr to compression list         */  \
                            Candidates,      /* Count of possible comp. chars   */  \
                            pWeight,         /* ptr to weight of character      */  \
                            CaseMask,        /* mask for case weight            */  \
                            pPosUW,          /* ptr to position in pUW buffer   */  \
                            pPosDW,          /* ptr to position in pDW buffer   */  \
                            pPosCW,          /* ptr to position in pCW buffer   */  \
                            cchSrc,          /* # of characters in source string*/  \
                            PosCtr,          /* position counter in string      */  \
                            pPos,            /* ptr to position in string       */  \
                            IfDblCompress, /*                                   */  \
                            left,            /*                                 */  \
                            right,           /*                                 */  \
                            median,          /*                                 */  \
                            iComp)           /*                                 */  \
{                                                                                    \
   if (((pHashN->pCompHdr->Num[(Type - 2)]) > 0) &&                                  \
       ((PosCtr + (Type - 1)) <= cchSrc))                                            \
   {                                                                                 \
      if(0 == Candidates)                                                            \
      {                                                                              \
         Candidates = NlsCountOfWCharsWithinRange(pPos,                              \
                                 Type,                                               \
                                 pHashN->pCompHdr->MinUCP,                           \
                                 pHashN->pCompHdr->MaxUCP);                          \
      }                                                                              \
                                                                                     \
      if(Candidates >= Type)                                                         \
      {                                                                              \
         IfDblCompress = FALSE;                                                      \
         left = 0;                                                                   \
         right = (pHashN->pCompHdr->Num[(Type - 2)]) - 1;                            \
                                                                                     \
         /* If it is a double compression locale, check for the possibility of  */  \
         /* double compressions now.                                            */  \
         if((pHashN->IfDblCompression) &&                                            \
            ((PosCtr + (Type)) <= cchSrc) &&                                         \
            ((GET_DWORD_WEIGHT(pHashN, *pPos) & CMP_MASKOFF_CW) ==                   \
```

-continued

```
            (GET_DWORD_WEIGHT(pHashN, *(pPos + 1)) & CMP_MASKOFF_CW)))    \
{                                                                         \
  IfDblCompress = TRUE;                                                   \
}                                                                         \
                                                                          \
while (left <= right)                                                     \
{                                                                         \
  median = (left + right) / 2;                                            \
                                                                          \
  if(IfDblCompress)                                                       \
  {                                                                       \
      /*                                                     */           \
      /* EXPLANATION OF HOW DOUBLE COMPRESSIONS WORK         */           \
      /*                                                     */           \
      /* A double-compression means that if 'dsz' is a compression then */ \
      /* 'ddsz' is equivalent to 'dszdsz'. The IfDblCompress check above */ \
      /* has indicated that the weights of pPos[0] and pPos[1] are       */ \
      /* equal, so now if pPos[1] to pPos[Type + 1] is a compression     */ \
      /* then we will have found a double compression.                   */ \
      /*                                                     */           \
      iComp = NlsCompareRgWChar(((pPos + 1)), &(pComp[median].CP1), Type); \
        if(0 == iComp)                                                    \
            {                                                             \
            /* Found it! Lets store the weights.             */           \
                                                                          \
              /* Note that for the sake of this double compression we will */ \
              /* store the weight twice.                    */           \
              pWeight = &(pComp[median].Weights);                         \
              *(pPosUW + 1) = *pPosUW = GET_UNICODE(pWeight);             \
              *(pPosDW + 1) = *pPosDW = GET_DIACRITIC(pWeight);           \
              *(pPosCW + 1) = *pPosCW = GET_CASE_FULL_COMP_MASK(pWeight) & \
                            CaseMask;                                     \
              pPosUW += 2;                                                \
              pPosDW += 2;                                                \
              pPosCW += 2;                                                \
                                                                          \
              /* Add one less than the compression type to source, plus one */ \
              /* since one will be added by "for" structure and the double  */ \
              /* compression added one to the number of chars we looked at. */ \
              pPos += (Type);                                             \
              PosCtr += (Type);                                           \
              break;                                                      \
            }                                                             \
  }                                                                       \
  else                                                                    \
  {                                                                       \
      iComp = NlsCompareRgWChar(pPos, &(pComp[median].CP1), Type);        \
      if(0 == iComp)                                                      \
      {                                                                   \
          /* Found it! Lets store the weights and increment. */           \
          pWeight = &(pComp[median].Weights);                             \
          *pPosUW = GET_UNICODE(pWeight);                                 \
          *pPosDW = GET_DIACRITIC(pWeight);                               \
          *pPosCW = GET_CASE_FULL_COMP_MASK(pWeight) & CaseMask;          \
          pPosUW++;                                                       \
          pPosDW++;                                                       \
          pPosCW++;                                                       \
                                                                          \
          /* Add one less than the compression type to source, */         \
          /* since one will be added by "for" structure.       */         \
          pPos += (Type - 1);                                             \
          PosCtr += (Type - 1);                                           \
          break;                                                          \
      }                                                                   \
  }                                                                       \
                                                                          \
  if (iComp < 0)                                                          \
  {                                                                       \
      right = median - 1;                                                 \
  }                                                                       \
  else                                                                    \
  {                                                                       \
      left = median + 1;                                                  \
  }                                                                       \
}                                                                         \
                                                                          \
if (0 == iComp)                                                           \
{                                                                         \
  break;                                                                  \
}                                                                         \
```

-continued

```
       }                                                      \
     }                                                        \
}
```

This simple macro has replaced thousands of lines in the source code for the prior collation framework for searching through compression tables. With the macro described above, a simple switch module such as the one provided below can be used to perform a search through all the compression tables.

```
switch (GET_COMPRESSION(pWeight))
{
    //
    // Jump to the appropriate compression type to
    // check. When a compression is found, the macro
    // will break out of the switch block; otherwise,
    // fall through and check the next compression.
    //
    case (COMPRESS_8_MASK):
        SORTKEY_COMPRESSION_HANDLER(8, pHashN->pCompress8,
                                    CompressionCandidateChars, pWeight,
                                    CaseMask, pPosUW, pPosDW, pPosCW,
                                    cchSrc, PosCtr, pPos, IfDblCompress, left,
                                    right, median, iComp);
    case (COMPRESS_7_MASK):
        SORTKEY_COMPRESSION_HANDLER(7, pHashN->pCompress7,
                                    CompressionCandidateChars, pWeight,
                                    CaseMask, pPosUW, pPosDW, pPosCW,
                                    cchSrc, PosCtr, pPos, IfDblCompress, left,
                                    right, median, iComp);
    . . .
    . . .
    . . .
    default:
        //
        // No possible compression for character, so store
        // the various weights for the character.
        //
        *pPosUW = GET_UNICODE_SM(pWeight, SM);
        *pPosDW = GET_DIACRITIC(pWeight);
        *pPosCW = GET_CASE_FULL_COMP_MASK(pWeight) & CaseMask;
        pPosUW++;
        pPosDW++;
        pPosCW++;
}
```

Figure 6:
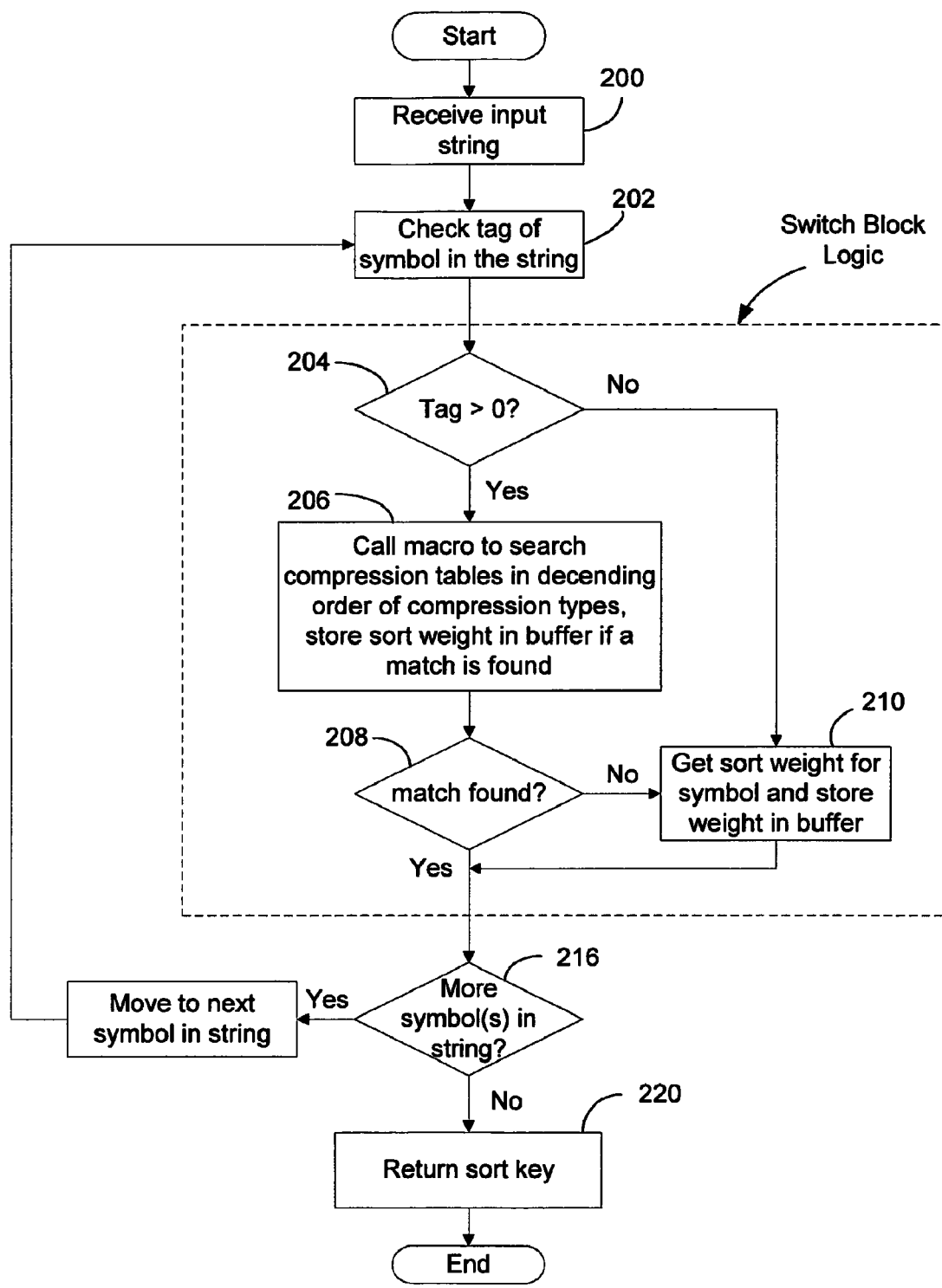
FIG. 6 is a flowchart showing a linguistic sorting operation using the architecture of FIG. 2.

FIG. 6 summarizes how the data structures and software modules described above are used in a sorting operation with respect to a given string. To obtain the sort key associated with a string of characters, an application calls the LCMapString API and passes the string and the LCID for the language as input to the API (step 200). The API module then goes through the characters in the input string and uses the sorting macro to identify the sort elements in that string and get the sorting weights of the sort elements. Specifically, starting with the first symbol in the input string, the API module first checks the default table to get the compression tag in the CW value for that symbol (step 202). As described above, the tag indicates the highest type of compressions that begin with that symbol. The API module then enters the switch block as described above, the effect of which is represented by steps 204-210. Specifically, if the tag value is greater than 0 (step 204), which indicates that the symbol may be used in compressions, the sorting macro is called to search through the compression tables, starting with the one of the compression type indicated by the tag (step 206). As described above, the macro uses a binary search method to minimize the number of comparisons that have to be made to search through a compression table. If a match between a compression in the compression table and the string characters is found, the macro stores the sorting weight of that compression in a buffer (step 206) and breaks out of the switch block. If, however, a match is not found in that compression table, the switch block goes to the next compression table that is one level below the compression level just searched, and calls the macro to search that compression table. In this way, the same macro is used to go through the compression tables one by one in the descending order of the compression types until a match with a compression is found. If no match is found in the compression tables (step 208), the sort weight values for that symbol is retrieved and stored in the buffer (step 210). If the symbol is not used in any compression (i.e., the tag value is 0), the sort weight values for that symbol are retrieved and stored in the buffer (step 210). The sort weight for that symbol may be provided by the default symbol table, or from an exception table if there is an entry for that symbol in the exception table for the LCID. After the sort weight is found for the first sort element (symbol or compression) in the input string, if there is a next symbol after the processed sort element in the string (step 216), the API program moves on to that next symbol, retrieves the compression tag for that next symbol (step 202), and again enters the switch block using the macro to search through the compression tables to find a match. After going through all the sort elements in the input string (step 216), the API takes the combination of the sort weights stored in the buffer for the identified sort elements in the string as the sort key for the sting, and returns the sort key to the calling application (step 220).

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for performing a method for building a symbol table for storing sort weights for a plurality of linguistic symbols used in a plurality of languages supported by a computer system, the method comprising:

constructing the symbol table to contain a list of code points for a plurality of linguistic symbols used in a plurality of languages, wherein each entry in the list includes a code point uniquely identifying one linguistic symbol of the plurality of linguistic symbols and a sort weight for the one linguistic symbol uniquely identified by the code point, the sort weight including at least two of a script member value for the linguistic symbol, an alphabetic weight value for the linguistic symbol, a diacritic weight value for the linguistic symbol, and a case weight value for the linguistic symbol;

providing a plurality of compression tables for the plurality of languages, each compression table pertaining to one of the supported languages and having a particular compression type identifying a number of symbols in a given compression in the compression table, wherein each entry in the compression table comprises a compression of symbols of the particular compression type, each compression of symbols in the plurality of compression tables being a grouping of two or more symbols treated as a single sort element for purposes of linguistic sorting such that an order of a given compression in the linguistic sorting is determined based on a compression type of the given compression, a first of the two or more symbols in the given compression and a predefined order of symbols; and for each code point in the symbol table,
sorting the plurality of compression tables for the plurality of languages using a processor of the computer, based on the sort elements;
identifying a highest compression type for compressions in the plurality of compression tables beginning with the symbol identified by the code point, wherein the identified highest compression type indicates the highest compression type, for the code point, in the plurality of compression tables for the plurality of languages; and
storing, in the symbol table, a tag for the code point to indicate said highest compression type for the code point, wherein the tag for the code point is stored as a portion of the sort weight of the symbol identified by the code point, and wherein the sort weight of the symbol identified by the code point comprises a case weight value, and wherein the tag for the code point is stored as part of the case weight value for the code point.

2. A computer-readable medium as in claim 1, wherein the code points are assigned to the symbols according to the Unicode standard.

3. A computer-readable medium as in claim 1, further comprising computer-executable instructions for performing steps of sorting compressions in each of the compression tables based on combinations of code points of the compressions in said each compression table.

4. The computer-readable medium of claim 1, wherein a first compression table of the plurality of compression tables has a first compression type such that each compression in the first compression table has a first number of symbols, and wherein a second compression table of the plurality of compression tables has a second, different compression type such that each compression in the second compression table has a second number of symbols, the second number being different than the first number.

5. The computer-readable medium of claim 4, wherein sorting comprises, for each code point in the symbol table, sorting the first and second compression tables based on the sort elements.

6. The computer-readable medium of claim 5, wherein the identified highest compression type indicates the highest compression type for the code point in the first or second compression table.

7. A method of building a symbol table for storing sort weights for a plurality of linguistic symbols used in a plurality of languages supported by a computer system, comprising:

constructing the symbol table to contain a list of code points each uniquely identifying one of the symbols, and a sort weight for the symbol identified by said each code point;

providing a plurality of compression tables for the plurality of languages, each compression table pertaining to one of the supported languages and having a compression type and containing compressions of symbols of that compression type, the compression type identifying a number of symbols in a compression, and each compression being a grouping of two or more symbols treated as a single sort element for purposes of linguistic sorting;

for each code point in the symbol table, sorting the plurality of compression tables for the plurality of languages to order the compressions in the plurality of compression tables and to identify a highest compression type for all of the compressions in the plurality of compression tables, the order of the compressions being performed by ordering compressions based on a first of the two or more symbols and then ordering the compressions based on compression types, beginning with the symbol identified by said each code point; and storing a tag in the symbol table for each code point to indicate said highest compression type for said each code point, wherein the tag for each code point is stored as a portion of the sort weight of the symbol identified by said each code point, and wherein the sort weight of the symbol identified by said each code point comprises a case weight value, and wherein the tag for said each code point is stored as part of the case weight value for said each code point.

8. A method as in claim 7, wherein the code points are assigned to the symbols according to the Unicode standard.

9. A method as in claim 7, further comprising sorting compressions in each of the compression tables based on combinations of code points of the compressions in said each compression table.

10. A computer-readable medium having computer-executable instructions for performing a computer search program to carry out a linguistic sorting operation, comprising:

receiving an input string containing a plurality of letters used in a given language;

for a first letter in a combination of letters in the input string, referencing a symbol table to obtain a highest compression type for compressions beginning with said first letter, wherein the highest compression type indicates the highest compression type for all compressions in a plurality of compression tables relating to a plurality of languages, each compression being a grouping of two or more letter treated as a single sort element for purposes of linguistic sorting and the compression type identifying a number of letters in a given compression, the symbol table having a list of code points each uniquely identifying a letter and a sort weight for the letter identified by said each code point, wherein a tag is stored as a portion of a sort weight for the first letter and identifies the highest compression type for compressions beginning with the first letter, and wherein referencing the symbol table comprises accessing the tag stored in the portion of the sort weight for the first letter to obtain the highest compression type;

performing a binary search through each of the plurality of compression tables containing compressions for the given language to find a matching compression that matches said combination of letters in the input string, wherein the plurality of compression tables are searched in a descending order of compression types of the compression tables starting with a compression table having a compression type equal to said highest compression type for said first letter.

11. The computer-readable medium of claim 10, wherein performing a binary search comprises performing a binary search using a processor of the computer.

12. The computer-readable medium of claim 10, wherein the combination of letters comprises a first combination of letters in the input string, the method further comprising:

identifying a next combination of letters in the input string, the next combination of letters following the first combination of letters in the input string;

for a first letter in the next combination of letters in the input string, referencing the symbol table to obtain a highest compression type for compressions beginning with said first letter in the next combination of letters;

performing a binary search through each of the plurality of compression tables containing compressions for the given language to find a matching compression that matches said next combination of letters in the input string, wherein the plurality of compression tables are searched in a descending order of compression types of the compression tables starting with a compression table having a compression type equal to said highest compression type for said first letter in the next combination of letters in the input string.

13. A computer-readable medium as in claim 11, wherein the compressions in each of the compression tables are sorted according to code points for letters forming the compressions.

14. A computer-readable medium as in claim 13, wherein each code point in the symbol table includes a tag indicating a highest compression type for said each code point, and wherein said step of referencing retrieves the tag for the code point identifying said first letter.

15. A computer-readable medium as in claim 14, wherein the tag for each code point in the symbol table is stored as a portion of the sort weight for said each code point.

16. A computer-readable medium as in claim 11, wherein the code points in the symbol table are assigned to letters according to a Unicode standard.

17. A computer-readable medium as in claim 11, wherein the computer-executable instructions for performing a binary search form a module that is called for searching each of the compression tables.

18. A computer-readable medium as in claim 11, having further computer-executable instructions for storing a sort weight for the matching compression.

* * * * *